United States Patent
Armoni et al.

(10) Patent No.: US 10,129,913 B2
(45) Date of Patent: Nov. 13, 2018

(54) METHOD AND SYSTEM FOR DIRECT COMMUNICATION BETWEEN MOBILE TERMINALS

(71) Applicants: Hanan Armoni, D.N. Modiin (IL); Saar Shlapobersky, Ramot-Hashavim (IL)

(72) Inventors: Hanan Armoni, D.N. Modiin (IL); Saar Shlapobersky, Ramot-Hashavim (IL)

(*) Notice: Subject to any disclaimer, the term of this patent is extended or adjusted under 35 U.S.C. 154(b) by 44 days.

(21) Appl. No.: 15/107,788

(22) PCT Filed: May 13, 2014

(86) PCT No.: PCT/IB2014/061399
§ 371 (c)(1),
(2) Date: Jun. 23, 2016

(87) PCT Pub. No.: WO2015/104592
PCT Pub. Date: Jul. 16, 2015

(65) Prior Publication Data
US 2016/0345373 A1    Nov. 24, 2016

(30) Foreign Application Priority Data
Jan. 9, 2014 (AT) .................................. A 12/2014

(51) Int. Cl.
H04W 76/02    (2009.01)
H04B 7/26    (2006.01)
(Continued)

(52) U.S. Cl.
CPC .......... *H04W 76/023* (2013.01); *A47G 19/12* (2013.01); *A47G 19/2227* (2013.01);
(Continued)

(58) Field of Classification Search
CPC .......... H04W 76/02; H04W 72/04; H04J 3/16
See application file for complete search history.

(56) References Cited

U.S. PATENT DOCUMENTS 5,995,500 A * 11/1999 Ma ........................ H04W 84/08
370/337
6,047,178 A    4/2000 Frlan
(Continued)

FOREIGN PATENT DOCUMENTS

| EP | 0 532 103 A1 | 3/1993 |
| EP | 0 713 345 A2 | 5/1996 |
| EP | 0 964 532 A2 | 12/1999 |

OTHER PUBLICATIONS

Vern A. Dubendorf, "Wireless Data Technologies—Reference Handbook" pp. 41-43, Published: Mar. 2003; Wiley Publishing.*
(Continued)

*Primary Examiner* — Xavier Szewai Wong
(74) *Attorney, Agent, or Firm* — Seed IP Law Group LLP

(57) ABSTRACT

The invention pertains to a method for direct communication between mobile terminals by using GSM carrier frequencies, wherein each carrier frequency transmits TDMA frames with a TDMA frame duration of 4.615 ms and each TDMA frame comprises 8 time slots with a duration of 577 microseconds, with the invention being characterized in that a multiframe is agreed upon by combining multiple TDMA frames, preferably 26 TDMA frames, wherein the involved terminals operate in the simplex mode and always transmit and receive in separate time slots within an agreed TDMA frame of the multiframe.

16 Claims, 5 Drawing Sheets

Figure 1:
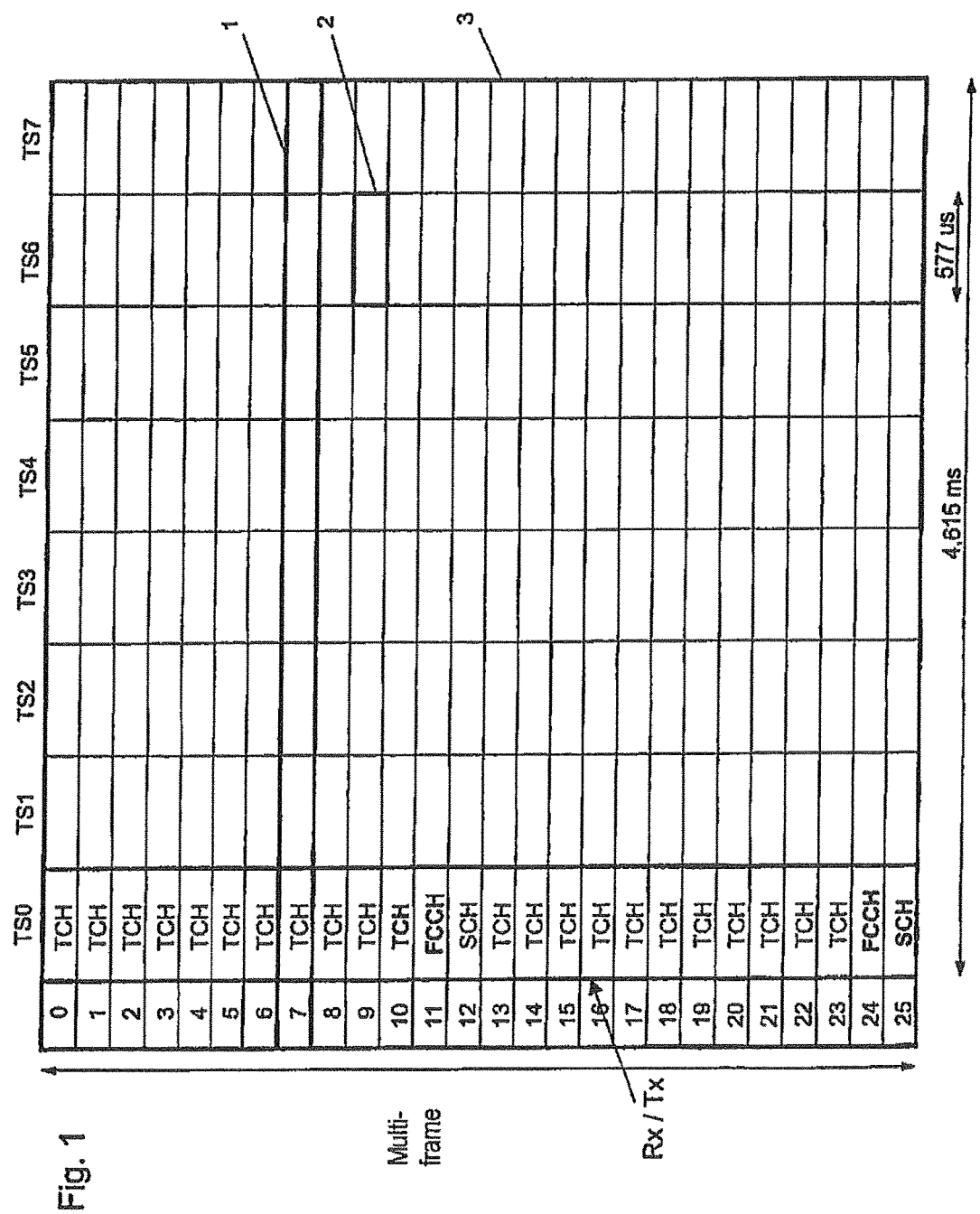

(51) Int. Cl.
*H04J 3/16* (2006.01)
*H04W 72/04* (2009.01)
*H04W 76/14* (2018.01)
*A47G 19/12* (2006.01)
*A47G 19/22* (2006.01)

(52) U.S. Cl.
CPC .......... *H04B 7/2656* (2013.01); *H04J 3/1694* (2013.01); *H04W 72/0446* (2013.01); *H04W 76/14* (2018.02)

(56) References Cited

U.S. PATENT DOCUMENTS

| | | | | |
|---|---|---|---|---|
| 6,154,661 | A * | 11/2000 | Goldburg | H01Q 1/246 370/277 |
| 6,240,288 | B1 * | 5/2001 | Wan | H04W 52/0245 455/426.1 |
| 6,741,583 | B1 * | 5/2004 | Klein | H04B 7/2612 370/342 |
| 2008/0085721 | A1 * | 4/2008 | Hirano | H04W 16/14 455/452.1 |
| 2009/0028115 | A1 * | 1/2009 | Hirsch | G06Q 10/0637 370/337 |
| 2009/0233615 | A1 * | 9/2009 | Schmitt | H04W 72/005 455/452.1 |
| 2011/0077017 | A1 * | 3/2011 | Yu | H04L 5/0007 455/452.1 |
| 2014/0286210 | A1 * | 9/2014 | Das | H04L 1/201 370/311 |

OTHER PUBLICATIONS

International Search Report, dated Sep. 12, 2014, for PCT/IB2014/061399, 3 pages.

* cited by examiner

METHOD AND SYSTEM FOR DIRECT COMMUNICATION BETWEEN MOBILE TERMINALS

The invention pertains to a method and a system for direct communication between mobile terminals.

In the GSM standard for mobile voice and data transmission between the mobile terminals, which is widely used throughout the world, the digital data is transmitted with a mix of frequency division multiplexing and time division multiplexing (Time Division Multiple Access, TDMA), wherein the transmission band and the reception band lie in different frequency bands. The GSM frequency band is divided into multiple channels that are spaced apart by 200 kHz. In GSM 900, 124 channels are provided for the uplink direction (uplink) to the base station in the range between 890-915 MHz and 124 channels are provided for the downlink direction (downlink) in the range between 935-960 MHz.

The TDMA frame duration is approximately 4.615 ms and corresponds to the duration of exactly 1250 symbols. Each of the eight time slots per frame therefore has a duration of approximately 0.577 ms, which corresponds to the duration of 156.25 symbols. Bursts of different types can be transmitted and received in these time slots. The duration of a normal burst amounts to approximately 0.546 ms, during which 148 symbols are transmitted.

After the transmission of a reception burst, the mobile telephone switches to the transmission frequency, which is offset by 45 MHz, and transmits the burst of the backward channel to the base station on this transmission frequency. One antenna suffices for both directions because the downlink and the uplink are offset by three time slots.

However, a GSM telephony system always requires an operative network that is realized in the form of one or more base stations. Direct communication between the terminals is not provided in this system.

The invention is based on the objective of developing a transmission method, by means of which two or more mobile terminals operating in accordance with the GSM standard can also directly communicate with one another. This should be achieved without any modifications to the hardware, i.e. with software modifications only.

The operation in this so-called direct mode (DM) should also allow communications when the network fails, e.g. in disaster situations or when no network is available for other reasons such as, for example, in rural areas or in the case of commercial use, e.g., by railway workers. Since the direct mode is not dependent on the network, no network-related costs are accumulated during the data transmission. For example, one potential application would be large construction sites, on which many employees can communicate with one another using conventional terminals. These communications would result in significant costs in the conventional network mode.

According to the invention, the above-defined objective is attained in that the existing GSM carrier frequencies are used, wherein each carrier frequency transmits TDMA frames with a TDMA frame duration of 4.615 ms and each TDMA frame comprises 8 time slots with a duration of 577 microseconds, and wherein a multiframe is agreed upon by combining multiple TDMA frames, preferably 26 TDMA frames, with the involved terminals operating in the simplex mode and always transmitting and receiving in separate time slots within one agreed TDMA frame of the multiframe.

This provides the advantage that the conventional GSM transmission is not affected: the terminals can still transmit and receive in the GSM system, namely in the unused time slots of the multiframe. Individual time slots of the GSM transmission frame merely are used for the simplex communication with other terminals. The involved terminals use the GSM transmission frame and establish a separate, synchronized multiframe with separate synchronization and frequency correction, within which they can communicate with one another in simplex mode.

According to the invention, a certain frequency range for the direct communication can be selected by means of an internal filter of the terminals, wherein said frequency range overlaps or preferably comprises the GSM uplink or GSM downlink frequency band. However, a separate, license-free frequency band can also be used for the direct communication.

According to the invention, frequency correction bursts FCCH can be transmitted in two TDMA frames, preferably in positions 11 and 24 of the multiframe, synchronization bursts SCH can be transmitted in two additional TDMA frames, preferably in positions 12 and 25 of the multiframe, and data bursts TCH can be transmitted in the remaining TDMA frames of the multiframe.

According to the invention, 158.25 bits can be transmitted in each time slot, wherein a data burst TCH comprises a training sequence of 26 bits and two data packets of 57 bits, a synchronization burst SCH comprises a training sequence of 64 bits and two data packets of respectively 39 bits, and the frequency correction burst FCCH comprises 142 bits with the symbol "0."

According to the invention, a mobile terminal can assume a repeater function, wherein it forwards a data packet, which is received in a first time slot of an agreed TDMA frame, preferably at position TS0, in a second time slot of the same TDMA frame, preferably at position TS3.

According to the invention, the terminal can forward the received data packet in different time slots within the agreed TDMA frame, preferably in positions TS3, TS4 and TS5, depending on whether it is the first, second or third repeater. This prevents a collision of the data packets in overlapping areas between the originally transmitted signal and the signal forwarded by the repeater.

According to the invention, the direct communication method is implemented in the form of a stand-alone method by means of software modifications in the mobile terminal only, i.e. the method can be carried out without network coverage. It can be carried out simultaneously with a GSM transmission.

With respect to the software, new Level 1, Level 2 and Level 3 protocols may be provided while the signal processor and all hardware functions are shared with the GSM functionality.

The invention furthermore pertains to a mobile terminal, particularly a mobile telephone, which is designed for carrying out the described inventive method, as well as to a system consisting of a plurality of mobile terminals, on which the described inventive method is carried out.

FIG. 1 shows an exemplary embodiment of a multiframe 3 according to the invention that comprises 26 individual TDMA frames 1. Each TDMA frame 1 comprises eight time slots 2 that are respectively identified by the reference symbols TS0 to TS7. In the direct communication mode, bursts identified by the reference symbols TCH, FCCH and SCH are transmitted in the time slots. The abbreviation TCH stands for the Traffic Channel Burst containing the voice data to be transmitted. The abbreviation FCCH stands for Frequency Correction Channel and the abbreviation SCH stands for Synchronization Channel. The frames 11 and 24 within the multiframe serve for the transmission of the frequency correction burst FCCH and the frames 12 and 25 serve for the transmission of the synchronization burst SCH. In the transmission mode as well as in the reception mode, only the first time slot TS0 in each TDMA. frame of the multiframe is reserved for transmitting or receiving while the other time slots TS1 to TS7 remain available. The transmission takes place in the simplex mode such that a mobile terminal always can either transmit or receive only.

Figure 2:
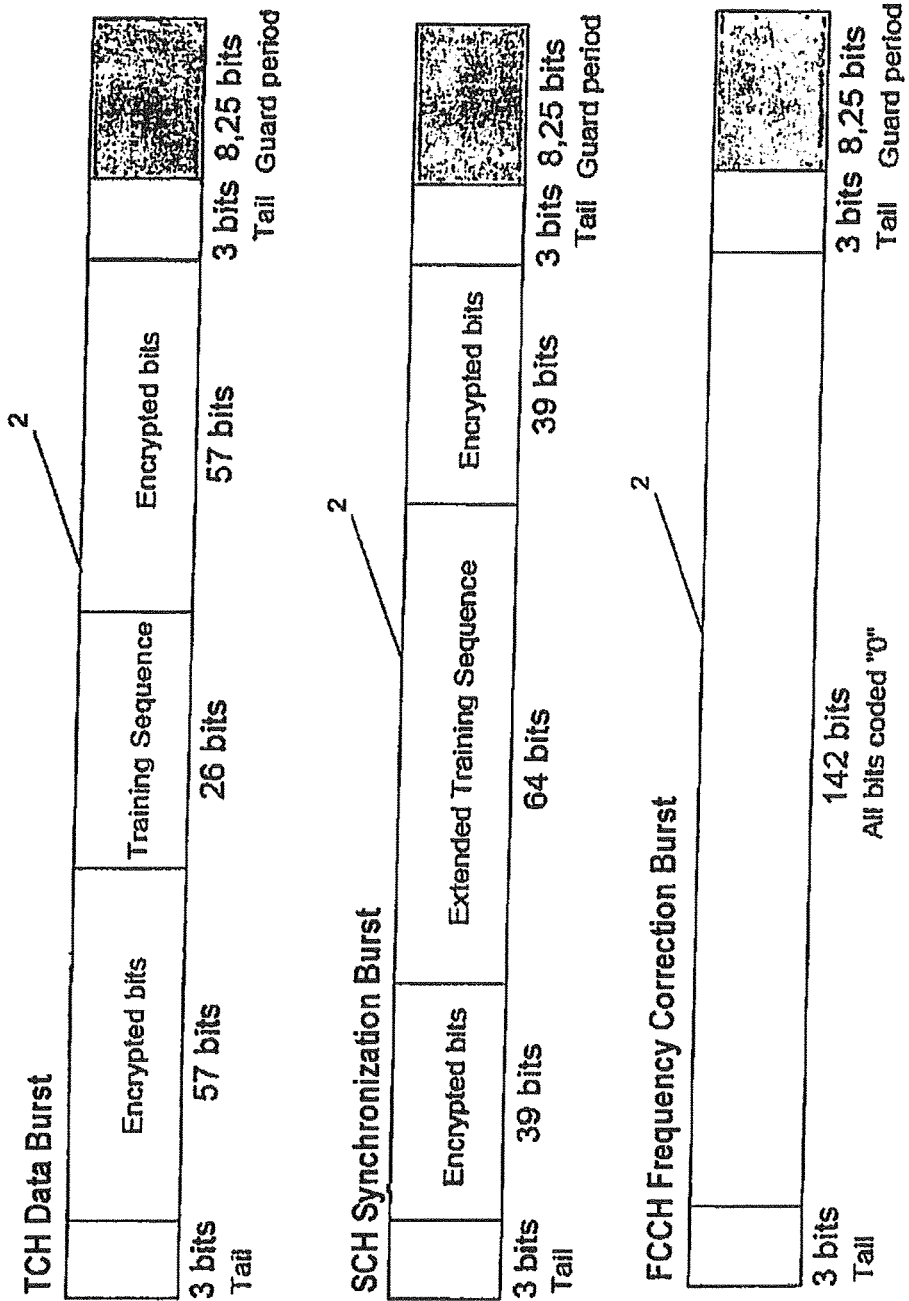

FIG. 2 shows the structure of a TCH data burst, an SCH synchronization burst and a FCCH frequency correction burst. 114 data bits are transmitted in a TCH data burst, 78 data bits are transmitted in an SCH synchronization burst and no data bits are transmitted in a frequency correction burst.

During the operation of terminals in the direct mode, the range is limited due to the relatively low transmission power and affected by the terrain. The present invention therefore also proposes that the mobile terminals according to the invention can assume a repeater function and switch the data transmission between two or more other terminals like a relay station.

Figure 3:
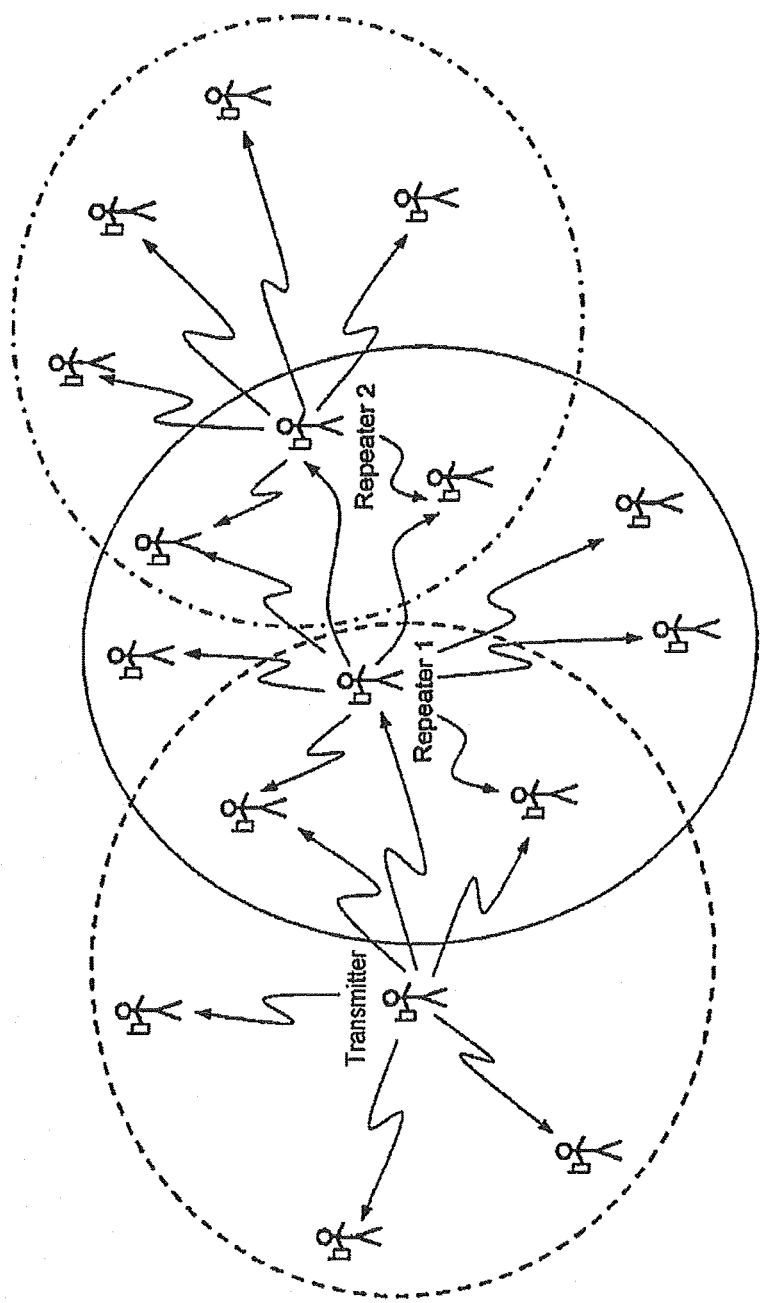

FIG. 3 shows the basic situation when the repeater function is activated. A transmitter transmits data to a first repeater in the direct communication mode. This first repeater is still located within the range of the transmitter and therefore receives and forwards the data within its range. A second repeater located within the range of the first repeater receives and forwards the data within its transmission range. This allows direct communication between terminals that are not located in the same transmission range.

Figure 4:
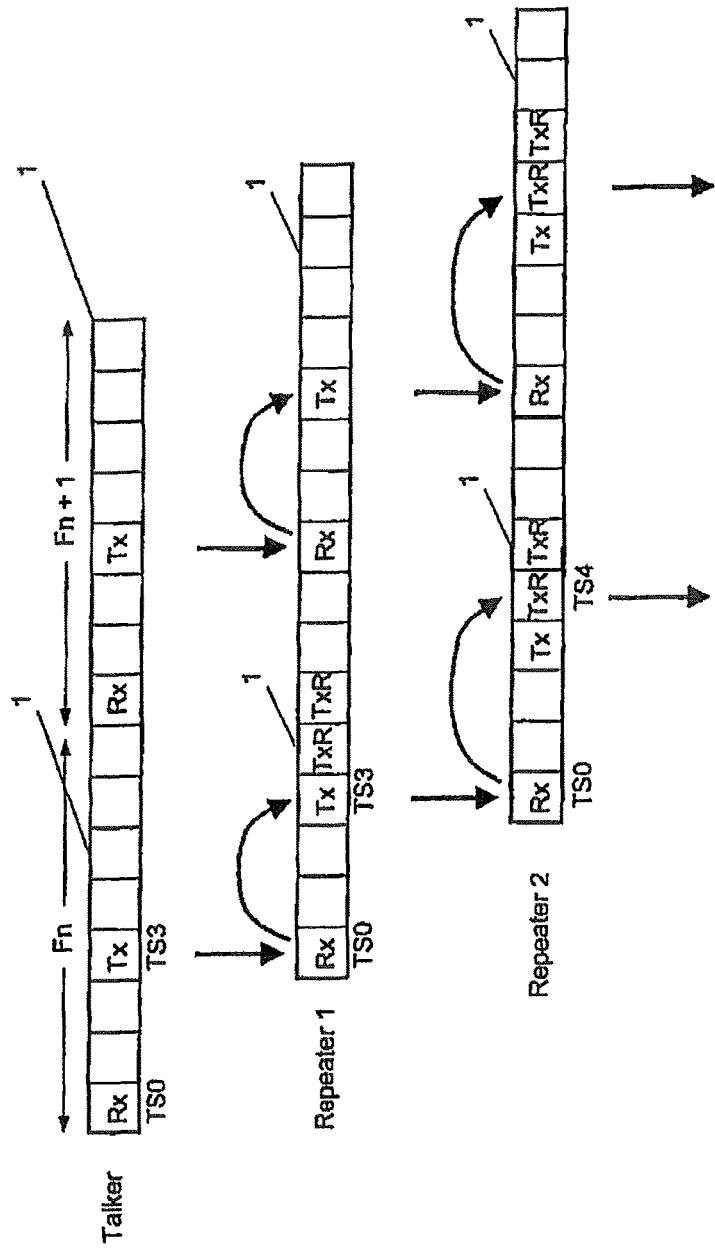

FIG. 4 shows the transmission protocol for the repeater function. Each frame not only occupies the time slot 1, but the remaining time slots are also used. The first time slot TS0 is used for receiving the transmitted burst. The signal is forwarded from the talker to the first repeater and from the first repeater to the second repeater in the time slot TS3. The second repeater receives the signal in the time slot TS0, which is identified by the reference symbol Rx, and transmits the signal in the time slot TS4. An additional repeater would also receive the data in the time slot TS0, but forward the data in the time slot TS5.

The transmission for the repeater function also takes place in the simplex mode such that each mobile terminal only can either transmit or receive.

Figure 5B:
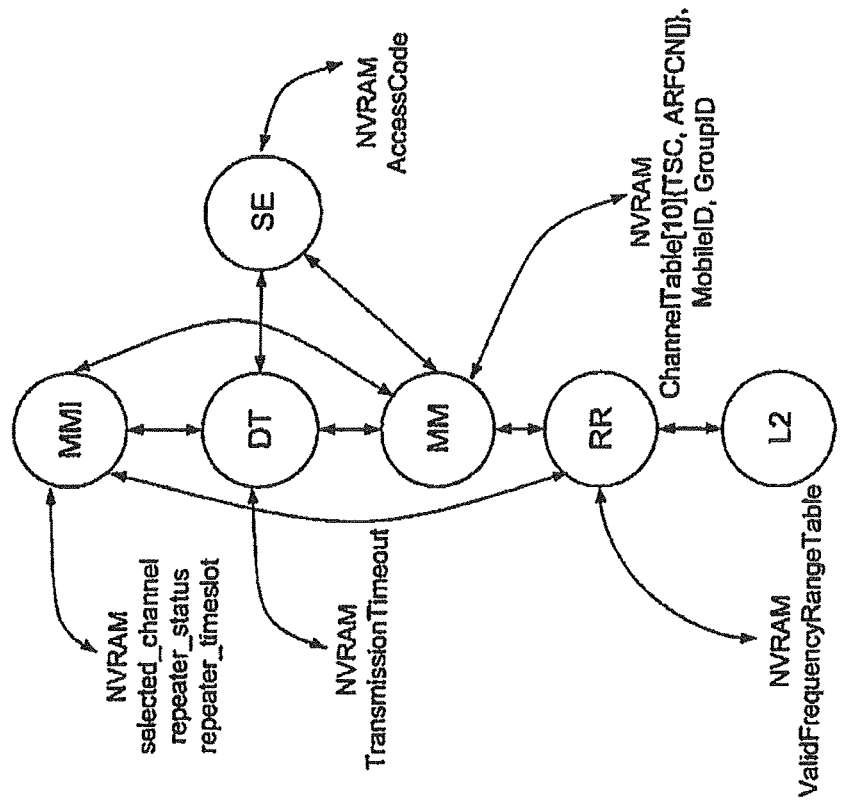
Figure 5A:
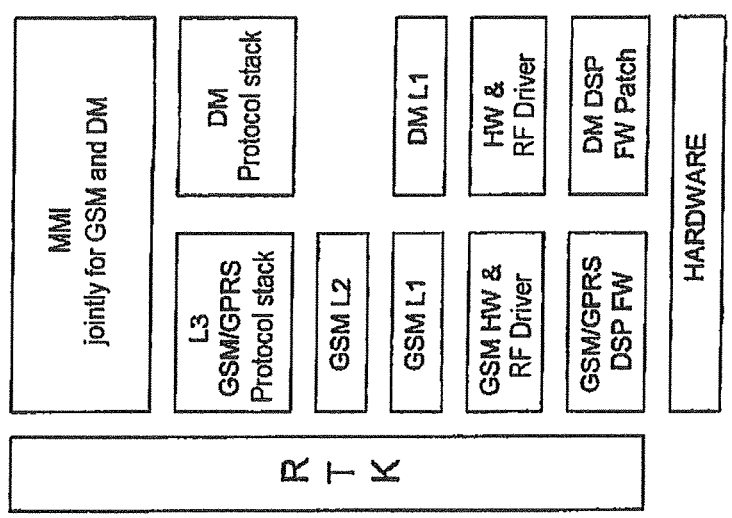

FIGS. 5a and 5b show the structure of the software stack for the presently described method in the form of a layer model in comparison with the conventional GSM software stack. The DM protocol stack in L2 or L3 comprises a Direct Transmission (DT) module for the call control, a Mobility Management (MM) module for supporting Mobile ID, User ID or Group ID, a Security (SE) module for supporting User Mode and Supervisor Mode, as well as a Radio Resource Management (RR) module.

The (not-shown) hardware-related DM L1 protocol is realized in the form of an expansion of the GSM L1 protocol and may be implemented in the GSM L1A or L1S layer in order to ensure the correct allocation of the time slots and TDMA frames, as well as the correct structure of the multiframe used.

The invention is not limited to the described exemplary embodiments, but rather includes all methods and systems within the scope of the following claims.

The invention claimed is:

1. A method for direct communication between mobile terminals using one or more signals in association with one or more Global Systems for Mobile Communications (GSM) carrier frequencies, wherein the one or more signals include Time-Division Multiple Access (TDMA) frames having a TDMA frame duration of 4.615 milliseconds and each TDMA frame comprises 8 time slots, each time slot having a duration of 577 microseconds, wherein a multiframe is agreed upon by combining multiple TDMA frames, wherein the involved mobile terminals operate in simplex mode and always transmit and receive in separate time slots within an agreed TDMA frame of the multiframe.

2. The method according to claim 1, wherein frequency correction channel (FCCH) bursts are transmitted in two of the TDMA frames, synchronization bursts (SCH) are transmitted in two of the TDMA frames, and traffic channel (TCH) data bursts are transmitted in the remaining TDMA frames of the multiframe.

3. The method according to claim 2, wherein 158.25 bits are transmitted in each time slot, wherein a TCH data burst comprises a training sequence of 26 bits and two data packets of 57 bits, a SCH burst comprises a training sequence of 64 bits and two data packets of respectively 39 bits, and the FCCH burst comprises 142 bits with the symbol "0".

4. The method according to claim 1, wherein a mobile terminal assumes a repeater function, the mobile terminal forwards a data packet, which is received in a first time slot of the agreed TDMA frame, and forwarded in a second time slot of the agreed TDMA frame.

5. The method according to claim 4, wherein the mobile terminal forwards the received data packet in different time slots within the agreed TDMA frame in a time slot, the time slot determined based at least in part on a number of mobile terminals that previously forwarded the data packet.

6. A mobile terminal that provides direct communication with other mobile terminals via communication of one or more signals in association with one or more Global Systems for Mobile Communications (GSM) carrier frequencies, wherein the one or more signals include Time-Division Multiple Access (TDMA) frames with a TDMA frame duration of 4.615 milliseconds and each TDMA frame comprises 8 time slots with a duration of 577 microseconds, wherein a multiframe is agreed upon by combining multiple TDMA frames, and the involved mobile terminals operate in simplex mode and always transmit and receive in separate time slots within an agreed TDMA frame of the multiframe.

7. The mobile terminal according to claim 6, wherein one or more of GSM Layer 1, 2 and 3 protocols are involved in the direct communications between the mobile terminal and the other mobile terminals.

8. The mobile terminal according to claim 6, wherein frequency correction channel (FCCH) bursts are transmitted in two of the TDMA frames, synchronization channel (SCH) bursts are transmitted in another two of the TDMA frames, and traffic channel (TCH) data bursts are transmitted in the remaining TDMA frames of the multiframe.

9. The mobile terminal according to claim 8, wherein 158.25 bits are transmitted in each time slot, wherein one or more of the TCH data bursts comprises a training sequence of 26 bits and two data packets of 57 bits, an SCH burst comprises a training sequence of 64 bits and two data packets of respectively 39 bits, and the FCCH burst comprises 142 bits with the symbol "0".

10. The mobile terminal according to claim 6, wherein the mobile terminal assumes a repeater function, the mobile terminal forwards a data packet, which is received in a first time slot of the agreed TDMA frame, in a second time slot of the same TDMA frame.

11. The mobile terminal according to claim 10, wherein the mobile terminal forwards the received data packet in different time slots within the agreed TDMA frame in a time slot, the time slot determined based at least in part on a number of mobile terminals that previously forwarded the data packet.

12. A system comprising a plurality of mobile terminals that provide direct communication between the mobile terminals via communication of one or more signals in association with one or more Global Systems for Mobile Communications (GSM) carrier frequencies, wherein the one or more signals include Time-Division Multiple Access (TDMA) frames with a TDMA frame duration of 4.615 milliseconds and each TDMA frame comprises 8 time slots with a duration of 577 microseconds, wherein a multiframe is agreed upon by combining multiple TDMA frames, and the involved mobile terminals operate in simplex mode and always transmit and receive in separate time slots within an agreed TDMA frame of the multiframe.

13. The system according to claim 12, wherein frequency correction channel (FCCH) bursts are transmitted in two of the TDMA frames, synchronization channel (SCH) bursts are transmitted in two of the TDMA frames, and traffic channel (TCH) data bursts are transmitted in the remaining TDMA frames of the multiframe.

14. The system according to claim 13, wherein 158.25 bits are transmitted in each time slot, wherein one or more of the TCH data bursts comprises a training sequence of 26 bits and two data packets of 57 bits, an SCH burst comprises a training sequence of 64 bits and two data packets of respectively 39 bits, and the FCCH burst comprises 142 bits with the symbol "0".

15. The system according to claim 12, wherein at least one of the mobile terminals assumes a repeater function, the at least one of the mobile terminals forwards a data packet, which is received in a first time slot of the agreed TDMA frame, and forwarded in a second time slot of the same TDMA frame.

16. The system according to claim 15, wherein the at least one of the mobile terminals forward the received data packet in different time slots within the agreed TDMA frame in a time slot, the time slot determined based at least in part on a number of mobile terminals that previously forwarded the data packet.

\* \* \* \* \*